INVENTOR.
R. S. ROGERS
BY Young & Quigg
ATTORNEYS

United States Patent Office 3,448,015
Patented June 3, 1969

3,448,015
DISTILLATION PROCESS WITH POLYMERIZATION INHIBITOR ADDITION AT SPECIFIC LOCATIONS FOR THE PURIFICATION OF POLYMERIZABLE ORGANIC COMPOUNDS
Ronald S. Rogers, Bartlesville, Okla., assignor to Phillips Petroleum Company, a corporation of Delaware
Filed Dec. 21, 1967, Ser. No. 692,212
Int. Cl. B01d 3/00; C07c 7/00
U.S. Cl. 203—8     7 Claims

ABSTRACT OF THE DISCLOSURE

Organic monomers are fractionally distilled in association with a polymer inhibitor solution and the inhibitor solution separated from the kettle section of the distillation column contains a high concentration of impurities. Before being returned to the top of the column, the separated inhibitor solution is contacted with at least a portion of a liquid from the distillation system thereby decreasing the concentration of impurities in the inhibitor solution. Therefore, the amount of impurities extracted by the monomer product is substantially reduced.

---

This invention relates to the purification of polymerizable organic compounds containing at least one vinylidene group during fractional distillation. In one aspect, it relates to a method for decreasing the concentration of impurities within the overhead product of the distillation column which results from the association of overhead product with a polymer inhibitor solution.

Throughout the specification, the term "monomer" is used to mean a polymerizable organic compound containing at least one vinylidene group.

In the fractional distillation of polymerizable organic compounds such as monoolefins or diolefins, there tends to form on fractionation trays, condensers, and other processing equipment undesirable polymers which have a deleterious effect on the distillation operation. These polymers are self-propagating and are insoluble in normal organic solvents such as benzene and carbon tetrachloride. In order to operate at optimum conditions without costly shutdown and cleaning of the system, a polymer inhibitor solution which is substantially insoluble in the monomer is circulated in the system. Examples of such polymer inhibitor solutions are aqueous alkaline earth or alkali metal nitrites as disclosed in U.S. Patent 2,613,175, Johnstone et al., issued Oct. 7, 1952; aqueous metal nitrite solution in combination with an aqueous solution of a compound selected from the group consisting of quinoid, nitro, amino, and phenol compounds, as disclosed in U.S. Patent 3,340,-160, Waldby, issued Sept. 5, 1967; dilute nitrous acid; ammonium N-phenylnitrosoamine; tertiary butylcatechol; and the like.

In a typical fractional distillation system, the vaporized monomer is discharged from the overhead section of the column where it passes to a condenser wherein it is condensed. Subsequently a portion of the condensed monomer is separated as product, and the remainder returned to the column as reflux. In order to prevent the formation of self-propagating polymers in the condenser, the accumulator, and on the trays of the column, the inhibitor solution is returned from the kettle section of the column to the overhead monomer stream ahead of the condenser. The inhibitor solution is then returned to the upper portion of the column along with the reflux and allowed to flow through the column to prevent formation of the polymers within the column.

Certain impurities, which are soluble in both the aqueous inhibitor and monomer, enter the column along with the monomer feed. Substantially all of the impurities are carried into the kettle section of the column and become dissolved in essentially equal concentrations in the heavy hydrocarbon phase and the aqueous inhibitor solution. Therefore, approximately one half of the impurities leave the system with the heavy hydrocarbons. The remaining impurities are carried by the aqueous inhibitor solution to the overhead monomer stream of the column.

Accordingly, it was discovered that when an aqueous inhibitor solution was associated with a monomer product the concentration of certain impurities in the resulting monomer product increased. These impurities, when present in the monomer product, render the monomer unfit for many polymerization purposes. Therefore, commercial specifications require that certain monomers contain a minimum concentration of these impurities. For example, 1,3-butadiene monomer is required to contain less than 50 parts per million carbonyls calculated as acetaldehyde. In addition, some purchasers require 1,3-butadiene to contain as little as 10 parts per million carbonyls. Therefore, it is desirable to provide to the art a method of reducing the concentration of contaminating impurities in the monomer product, while at the same time preventing formation of self-propagating polymers in the condenser, accumulator, and on the trays of the column.

I have discovered a method whereby monomers substantially free of contaminating impurities can be recovered from a fractional distillation system which utilizes a polymer inhibitor solution. Briefly, the invention resides in contacting a liquid hydrocarbon stream which has a lower concentration of impurities than the inhibitor solution with the inhibitor solution prior to the return of the inhibitor solution to the overhead product stream of the column. The contact of the two streams reduces the concentration of impurities within the inhibitor solution and, therefore, the amount of impurities extracted by the monomer product when the inhibitor solution is returned to the overhead stream of the column, is substantially reduced, while the important feature of prevention of polymer formation in the condenser and accumulator is realized.

Accordingly, it is an object of the invention to provide a process for substantially decreasing the amount of impurities in a polymerizable organic compound having at least one vinylidene group.

Other aspects, objects and the several advantages of this invention will be apparent to one skilled in the art from this disclosure, the appended claims, and the drawings wherein:

The monomers to which the process of this invention is applicable comprise unsaturated organic compounds which contain at least one vinylidene ($CH_2$=C<) group, and undergo self-propagating polymerization within a fractional distillation system. Included in this class of compounds are monomers which have the following general formula:

(I) 

wherein R is selected from the group consisting of hydrogen, halogen, aryl, alkyl, alkoxy, cycloalkyl and combinations thereof such as alkaryl, aralkyl and the like radicals, with the total number of carbon atoms in the molecule ranging from 4–12, inclusive. Representative examples of these compounds include 1,3-butadiene; 2,3- dimethyl-1,3-butadiene; 2-methoxy-1,3-butadiene, isoprene, chloroprene, bromoprene and the like. Another class of compounds which are found to be self-propagating polymer forming monomers have the following general formula:

(II)
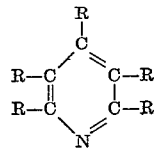

wherein at least one R must be

and the remaining R's are as defined for Formula I above; R' is hydrogen, methyl, ethyl or propyl radicals; and the total carbon atoms per moulecule range from 7 to 12, inclusive. A representative example of these compounds is methyl vinylpyridene. An additional class of compounds which are capable of self-propagating polymerization within a fractional distillation system have the general formula:

(III)
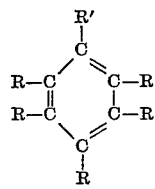

wherein at least one R is

R' is as defined in Formula II above, and the total number of carbon atoms per molecule ranges from 8 to 12 inclusive. The most notable representative example of this class of compounds is styrene.

The impurities which are removed from the fractional distillation system according to the process of this invention are any compound which is substantially soluble in both the inhibitor solution and the polymerizable monomer, and has a boiling point signifiicantly above that of the monomer. Included in this class of compounds, but not specifically limited thereto, are carbonyl ($>C=O$) compounds such as furans, furfural, acetaldehyde, propionaldehyde, dimethyl ketone, acetic acid, methyl acetate, and the like.

Figure 1:
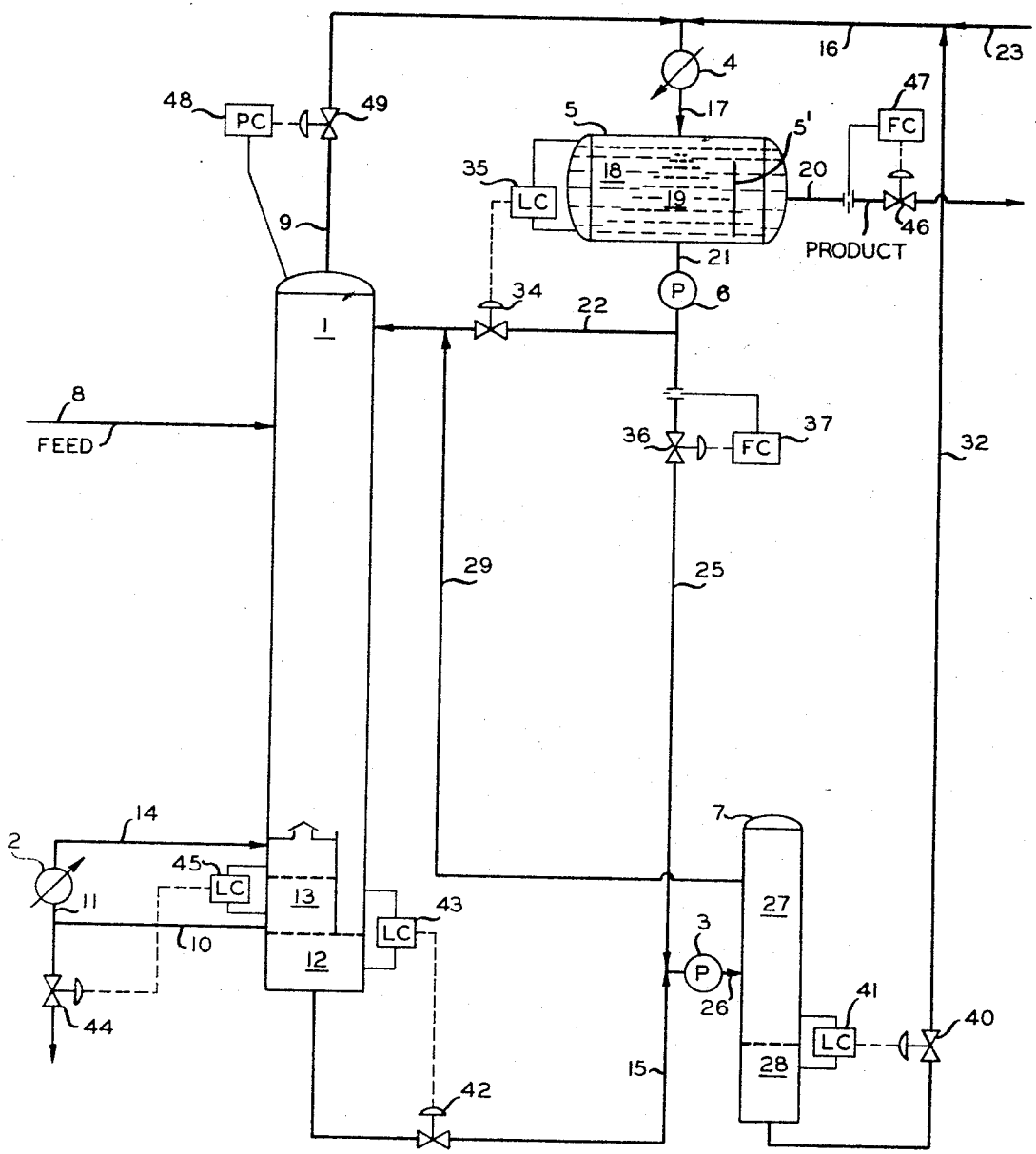
FIGURE 1 is a schematic flow diagram of one embodiment of my invention using a single fractional distillation column and a centrifugal pump to contact reflux liquid with inhibitor solution.

For the purposes of clarity and understanding of the invention, the drawings are explained with reference to the purification of 1,3-butadiene, although it is not intended that the description be limited thereto. FIGURE 1 of the drawing schematically illustrates one embodiment of the invention. A butadiene feed is fractionally distilled in column 1 in association with a polymer inhibitor solution such as aqueous sodium nitrite solution. The butadiene feed enters the column through conduit 8 and contains approximately 86 weight percent 1,3-butadiene, .03 weight percent carbonyls (primarily furfural), and 14.97 weight percent of other heavy hydrocarbons. The carbonyls are the impurities which, in accordance with the invention, are removed form the system, resulting in butadiene product suitable for polymerization purposes. As a result of heat supplied to the column by external reboiler 2, the butadiene is vaporized and passed from the column through conduit 9. The aqueous nitrite solution and heavy hydrocarbons settle into the kettle section of column 1 and separate into an upper heavy hydrocarbon phase 13 and a lower nitrite solution phase 12. The carbonyl impurity concentration in each phase approaches equilibrium. The heavy hydrocarbon phase 13 is withdrawn from the kettle section via conduit 10 and exits the system. A certain portion of heavy hydrocarbon phase 13 passes by conduit 11 into reboiler 2, wherein it is heated and returned to column 1 by conduit 14 to provide heat to the column. The nitrite solution is passed from the lower portion of the column 1 by conduit 15 to pump 3.

The overhead butadiene vapor passes through conduit 9 and the substantially purified nitrite solution is passed into conduit 9 by conduit 16. The butadiene vapor and nitrite solution is then passed to condenser 4, wherein the vapor is condensed. The liquid butadiene-nitrite solution then passes via conduit 17 to accumulator-separator 5. One end of accumulator-separator 5 is separated by a partition 5', which allows separation of the butadiene phase 18 from the combined butadiene-nitrite solution 19. An opening in the lower portion of partition 5' allows combined butadiene-nitrite solution to bleed back into the accumulator portion of the accumulator-separator 5. Butadiene product is withdrawn from accumulator-separator 5 from butadiene phase 18 by conduit 20, and passes from the system. The combined butadiene-nitrite solution phase 19 passes from accumulator-separator 5 through conduit 21 to pump 6. The combined phase is then refluxed to column 1 via conduit 22. The reflux liquid is forced at a constant rate into conduit 25 by pump 6. Conduit 25 intersects with conduit 15. The liquid reflux in conduit 25 and nitrite solution from line 15 are brought into intimate contact by the pumping action of pump 3. Within pump 3, the nitrite solution from line 15 which is high in concentration of carbonyls and the liquid reflux from line 25 which is low in concentration of carbonyls approach equilibrium with respect to carbonyl concentration, thereby reducing the concentration of carbonyls in the nitrite solution. The combined reflux and nitrite solution pass through conduit 26 into phase separator 7. Within separator 7 the reflux and nitrite solution separate into an upper liquid reflux phase 27 and a lower nitrite solution phase 28. The liquid reflux phase 27 is removed from separator 7 by conduit 29 and passes into conduit 22 for return of the reflux to the column 1. The substantially purified nitrite solution 28 is removed from separator 7 and transported by conduits 32 and 16 to conduit 9. Additional nitrite solution may be added to the system by conduit 23.

The rate of flow of liquid reflux which passes into column 1 through line 22, the rate of flow of liquid reflux which passes via line 25 to join inhibitor solution in conduit 15, is controlled by motor valve 34 located in line 22 intermediate the intersection of lines 22 and 25 and the intersection of lines 22 and 29. Motor valve 34 is operatively connected to liquid control 35 which senses changes in the level of liquid within the accumulating section of the accumulator-separator 5. The flow of liquid reflux through conduit 25 is controlled by motor valve 36 located in conduit 25 and operatively connected to a flow controller 37. Operation of valves 34 and 36 allows the quantity of liquid reflux which is passed to conduit 15 to be varied as needed.

Motor valve 40, operatively connected to level control 41 located in the lower portion of separator 7, controls the rate of flow of nitrite solution removed from the separator. Valve 42, located in line 15, and level control 43 operatively connected to the lower portion of column 1, controls the rate of flow of nitrate solution from the kettle section of column 1. Valve 44, located in line 10, and level control 45 operatively connected to the lower portion of column 1 regulates the rate of flow of unvaporized hydrocarbon from the kettle section of column 1. Motor valve 46, located in line 20 and operatively connected to flow recorder 47 regulates the rate of flow of 1,3-butadiene product removed from the accumulator-separator 5. Motor valve 49, located in line 9 and operatively connected to pressure control 48, regulates the amount of vaporized 1,3-butadiene which is removed from the column thereby controlling pressure in the column. Pressure control 48, operatively connected to the overhead section of column 1, senses pressure changes in column 1.

The operation of the system as substantially shown in FIGURE 1 illustrates the process of reducing the concentration of impurities in the nitrite solution prior to return of the nitrite to the overhead stream. Of course, any liquid from the column can be utilized to contact the nitrite solution which has a lower concentration of impurities than the nitrite solution.

Figure 2:
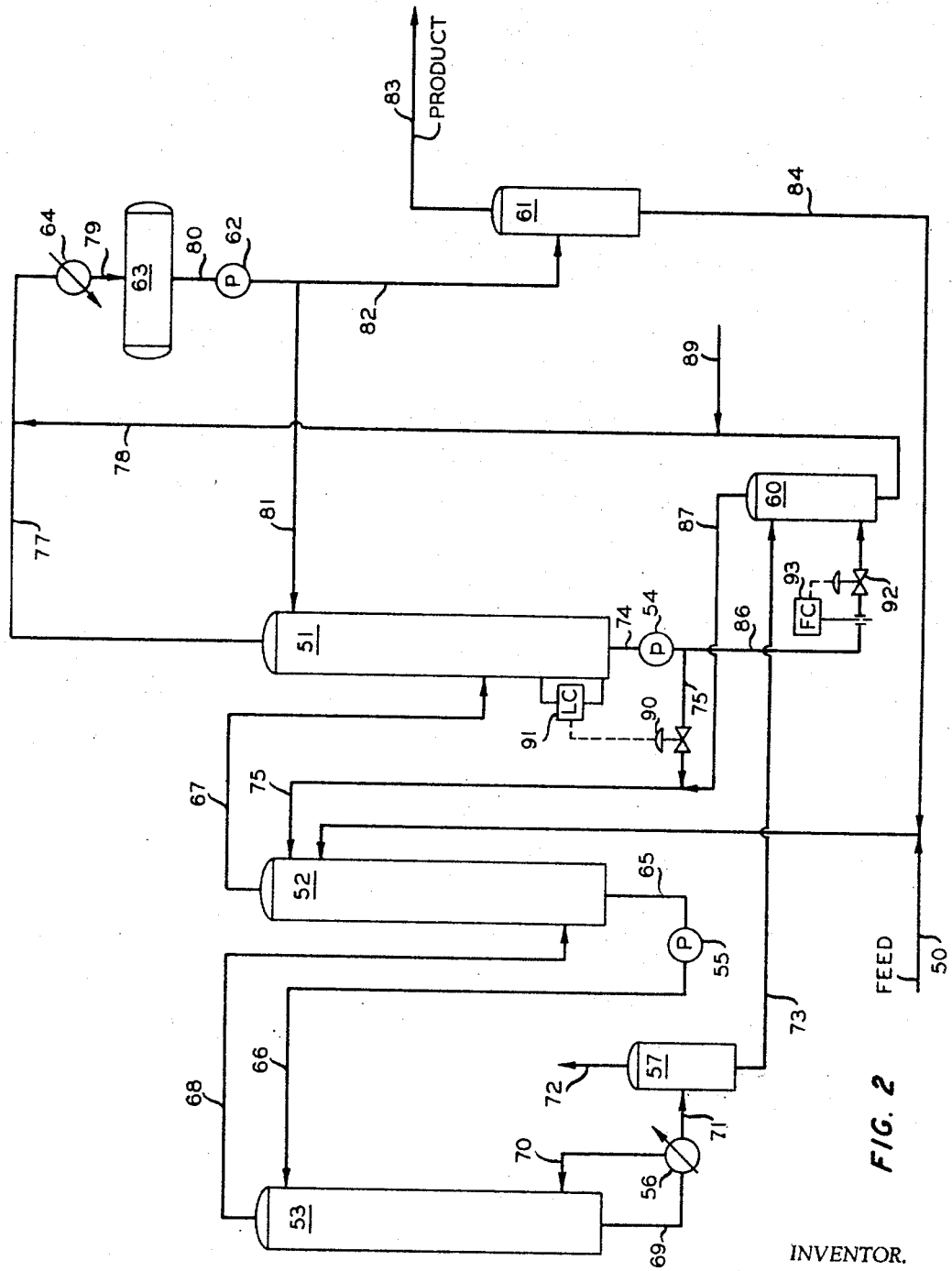
FIGURE 2 is a flow diagram of another embodiment in which three columns are used in series and reflux liquid and inhibitor solution are contacted in a countercurrent liquid-liquid contacting zone.

FIGURE 2 of the drawing schematically illustrates a preferred embodiment of the invention utilizing a fractional distillation system composed of three columns. A butadiene feed such as the one discussed above with respect to FIGURE 1, is introduced into column 52 by line 50. The kettle product of each of columns 51, 52, and 53 is composed of aqueous nitrite solution and unvaporized hydrocarbons. The kettle product of column 52 is passed via conduit 65 to pump 55, and through conduit 66 to the upper portion of column 53 as intermediate reflux. Vaporized butadiene is removed from the top of column 52 and passed to the lower portion of column 51 by conduit 67. In a like manner, the vaporized butadiene is removed from column 53 and passed to the lower portion of column 52 by means of conduit 68. The kettle product of column 53 is removed from the column by line 69, and passes into external reboiler 56. The liquid kettle product is heated and returned by line 70 to supply heat to the three columns. The remainder of the kettle product passes through conduit 71 into phase separator 57. The carbonyl concentration in the hydrocarbon and in the nitrite solution approach equilibrium in separator 57. The heavy hydrocarbons are removed from the upper portion of separator 57 by line 72 and exit the system. The aqueous nitrite solution is removed from a lower portion of separator 57 and passes via conduit 73 to the upper portion of a countercurrent liquid-liquid extraction column 60.

The kettle product of column 51 is passed by conduit 74 into pump 54 and thereby is forced through line 75 to the upper portion of column 52 as intermediate reflux to the column. The vaporized butadiene is removed from the top of column 51 and passes to condenser 64 by line 77. Substantially purified nitrite solution is introduced into line7 77 by conduit 78. The condensed liquid butadiene and purified nitrite solution passes from condenser 64 to accumulator 63 by line 79. The butadiene-nitrite solution is withdrawn from accumulator 63 and passed to pump 62 by means of line 80. Pump 62 forces a major portion of the liquid butadiene-nitrite solution through conduit 81 to the upper portion of column 51 as reflux to the column. A minor portion of the butadiene-nitrite solution passes through conduit 82 into phase separator 61. Therein, the aqueous nitrite solution and butadiene product separates into an upper butadiene phase and a lower aqueous nitrite solution phase. The butadiene product is removed from the upper portion of separator 61 by line 83 and passes from the system. The nitrite solution is removed from the lower portion of separator 61 and passes by line 84 to feed conduit 50.

A specified portion of liquid intermediate reflux in line 75 is forced by pump 54 into conduit 86, which passes from line 75 intermediate to pump 54 and column 52 and to the lower portion of column 60. Within column 60 the aqueous nitrite solution from conduit 73 is countercurrently contacted with the liquid intermediate reflux portion from line 86 thereby decreasing the concentration of carbonyls in the nitrite solution. The intermediate reflux portion is removed from the upper section of column 60 and is returned to line 75 by means of conduit 87. The substantially purified nitrite solution is withdrawn from the lower portion of column 60 and passes to line 77, intermediate to the column 51 in the condenser 64, by means of conduit 78. Additional nitrite may be added to the system by line 89 into conduit 78.

Positioned within conduit 75, intermediate the intersections of conduit 75 with lines 86 and 87, motor valve 90, operatively connected to level control 91 which is operatively connected to the lower portion of column 51, controls the quantity of reflux to column 52, and provides sufficient resistance to force a portion of the reflux into line 86. The rate of flow of liquid intermediate reflux allowed to pass into column 60 is controlled by motor valve 92, positioned in conduit 86, and operatively connected to flow controller 93. By controlling the opening of valves 90 and 92 the amount of liquid intermediate reflux passed to column 60 can be regulated as needed.

In the accompanying schematic drawings reference to some of the equipment such as pumps, gauges, and other equipment which would obviously be necessary to actually operate the process have been intentionally omitted. Only sufficient equipment has been shown to illustrate the process.

Reasonable variations and modifications are possible within the scope of the foregoing disclosure, the drawings, and the appended claims. For example, any method of contact which provides vigorous mixing of the reflux and inhibitor solutions to allow equilibrium with respect to impurity concentration to be approached between the two solutions can be utilized. Furthermore, the liquid reflux stream utilized to contact the inhibitor solution may have its origin at any point in the column(s) from the point at which monomer product is removed to the point where feed is introduced to the column. For example, referring once again to FIGURE 2 of the drawings, purification of the nitrite solution can be accomplished utilizing the liquid in conduit 81, instead of the liquid in conduit 5. Likewise, the purified inhibitor solution in conduit 78 can be returned directly to accumulator 63, although the return of line 78 to intersect with conduit 77 ahead of condenser 79 is preferred in order to minimize polymer fouling in the condenser.

A more comprehensive understanding of the invention can be obtained from the illustrative examples which, however, are not intended to limit the invention.

EXAMPLE I

To illustrate the results of operating without the improvements of my invention a 1,3-butadiene feed is fractionally distilled in a three column fractional distillation system as shown schematically in FIGURE 2 of the drawings, with the exception that conduit 73 which transports inhibitor solution from separator 57 was connected directly to line 78. Likewise, valve 92 positioned in conduit 86 was closed thereby preventing the use of column 60 to purify the nitrite solution. Analyses of the feed in line 50 prior to the intersection with conduit 84 revealed that the feed was composed of the following.

| Component: | Weight percent [1] |
|---|---|
| 1,3-butadiene | 86.00 |
| Carbonyls [2] | [3] 0.03 |
| Other hydrocarbons— | |
| Trans-2-butene | 12.00 |
| Cis-2-butene | 01.30 |
| 1-butene | 00.20 |
| $C_5$ and $C_5+$ hydrocarbons [4] | 00.50 |

[1] Parts by weight of component per 100 parts by weight of feed.
[2] Calculated as weight percent acetaldehyde.
[3] Represents 300 parts per million of feed.
[4] Includes hydrocarbons whose longest continuous carbon-carbon chain contains greater than four carbon atoms per molecule.

The columns were operated at a temperature of 110° F. and 75 p.s.i.a. at the top of column 51 and 165° F. and 100 p.s.i.a. at the bottom of column 53. Data showing composition and flow rates of various streams are summarized in the table. Analysis of a product sample from line 83 showed that the product contains 99.9 percent 1,3-butadiene and 30 parts per million carbonyls, primarily furfural.

EXAMPLE II

A second run was made utilizing the same feed as in Example I. However, the system used was as schematically shown in FIGURE 2 of the drawings. In other words, column 60 was employed to contact the intermediate reflux from line 75 with the aqueous nitrite solution in line 73. Data showing composition and flow rates of various streams are summarized in the table. Analyses of a sample taken from line 83 revealed that the product contains 99.9 percent 1,3-butadiene and 11 parts per million carbonyls.

TABLE

| Stream components | Example I | | Example II | |
|---|---|---|---|---|
| | Flow rate, g.p.h.[1] | Carbonyl conc., p.p.m.[2] | Flow rate, g.p.h. | Carbonyl conc., p.p.m. |
| Feed stream 50 | 10,000 | 300 | 10,000 | 300 |
| Stream 77 prior to entry of stream 78 | 158,300 | 0 | 158,300 | 0 |
| Nitrite stream 78 | 3,000 | 1,618 | 3,000 | 591 |
| Product stream 83 | 8,300 | 30 | 8,300 | 11 |
| Nitrite stream 84 | 158 | 30 | 158 | 11 |
| Reflux stream 86 | 0 | ---------- | 6,114 | 11 |
| Nitrite stream 73 to column 60 | 0 | ---------- | 2,886 | 1,711 |
| Nitrite stream 73 by passing column 60 to connect with stream 78 | 3,000 | 1,618 | 0 | ---------- |
| Reflux stream 87 | 0 | ---------- | 6,000 | 591 |
| Exit stream 72 | 1,700 | 1,618 | 1,700 | 1,711 |

[1] Gallons per hour.
[2] Parts per million by weight.

From the table it can be seen that use of column 60 to contact a portion of the liquid intermediate reflux from column 51 with the sodium nitrite solution recovered from separator 57 reduced the concentration of carbonyls in the nitrite solution passed to overhead stream 77 from 1618 parts per million to 591 parts per million. Therefore, the concentration of carbonyls within the 1,3-butadiene product was reduced from 30 parts per million to 11 parts per million. It should be noted that approximately twice the volume of intermediate reflux, when compared to the volume of nitrite solution, was utilized to contact the nitrite solution in column 60. When larger apparatus is utilized, such as increasing the size of column 60, the ratio of reflux to inhibitor solution can be correspondingly increased thereby reducing the concentration of impurities in the monomer product to substantially less than 10 parts per million.

As will be apparent to those skilled in the art, other variations can be made in my invention without departing from the spirit or scope thereof.

I claim:

1. In a process of separating by fractional distillation a polymerizable organic monomer containing at least one vinylidene group from a feed comprising said monomer, heavy organic compounds having a higher boiling point than the monomer, and impurities which are soluble in the monomer and the heavy organic compounds, wherein the distillation is accomplished in the presence of an aqueous inhibitor solution which is insoluble in the feed in order to prevent the formation of self-propagating polymers, and wherein the impurities are soluble in the aqueous inhibitor solution, the distillation occurring in at least a one column system thereby providing a bottoms stream and an overhead vapor stream, the overhead vapor stream being condensed to provide reflux to the column and said monomer as product, the bottom stream being separated to provide a heavy organic compound containing said impurities and an aqueous inhibitor stream containing said impurities; the improvement which comprises reducing the amount of said impurities in the monomer product, the contamination of the monomer product occurring when the inhibitor solution stream is returned to the system at a point upstream from the zone from which monomer product is withdrawn from the system, by the steps of: removing liquid from the system at a first zone intermediate the zone at which the monomer product is removed from the system and the zone at which said feed is introduced to the column, contacting the removed liquid with the inhibitor solution stream thereby reducing the concentration of impurities within the inhibitor solution, separating the removed liquid from the inhibitor solution and returning the liquid to the upper portion of the column, and returning the inhibitor solution having reduced concentration of impurities to the system up stream from the zone at which monomer product is removed from the system thereby reducing the amount of impurities which are associated with the monomer product.

2. The process according to claim 1 wherein said liquid removed from the system is that portion of the overhead vapor stream which is condensed and refluxed to the column; the said liquid returned to the system is returned to the reflux to the column downstream from said first zone; and the inhibitor solution having a reduced concentration of impurities is returned to the system into the overhead vapor stream prior to said overhead vapor stream being condensed.

3. The process according to claim 2 wherein said polymerizable organic monomer is an organic compound containing from 4–12 carbon atoms per molecule and undergoes self-propagating polymer formation within said system; said inhibitor solution is a dilute nitrous acid; an aqueous alkaline earth or alkali metal nitrite; an aqueous metal nitrite solution in combination with an aqueous solution of a compound selected from the group consisting of quinoid, nitro, amino, and phenol compounds; and said impurities are carbonyls.

4. The process according to claim 3 wherein said polymerizable monomer is 1,3-butadiene; said inhibitor solution is aqueous sodium nitrite solution; said impurity is furfural; said heavier organic compounds are unvaporized 1,3-butadiene, and at least one of 1-butene, trans-2-butene, cis-2-butene, and other higher molecular weight organic compounds; and said monomer product is 1,3-butadiene containing less than 30 parts per million furfural.

5. The process according to claim 2 wherein said contacting is effected within a countercurrent liquid-liquid extraction column wherein said separated inhibitor solution and said liquid removed from the system are simultaneously intermixed and separated.

6. In a process of separating by fractional distillation 1,3-butadiene from a feed comprising 1,3-butadiene, furfural, heavy organic compounds comprising unvaporized 1,3-butadiene, and at least one of 1-butene, trans-2-butene, and cis-2-butene, and other higher molecular weight organic compounds, wherein the distillation is accomplished in the presence of aqueous sodium nitrite solution in order to prevent the formation of self-propagating polymers, the distillation occurring in a three-column system, each column providing an overhead stream and a bottoms stream, the first column receiving said feed, the bottoms stream of said first column providing a first intermediate reflux stream into the upper portion of the second column, the overhead stream of the first column passing to the lower portion of the third column, the overhead stream of the second column passing to the lower portion of the first column, the overhead stream of the third column being condensed to provide reflux to the third column and 1,3-butadiene product, the bottoms stream of the third column providing a second intermediate reflux stream to the upper portion of the first column and the bottoms product of the second column providing a stream containing said heavy organic compounds and furfural which exits the system, and a stream containing aqueous sodium nitrite solution and furfural; the improvement which comprises reducing the amount of furfural in the 1,3-butadiene product by contacting a portion of the second intermediate reflux stream with the stream containing sodium nitrite and furfural from the bottom of the second column thereby reducing the concentration of furfural within the aqueous sodium nitrite solution, separating the intermediate reflux liquid from the sodium nitrite solution and returning the intermediate reflux liquid to the second intermediate reflux stream, returning the sodium nitrite solution having a reduced concentration of furfural to the overhead vapor stream of the third column thereby reducing the amount of furfural which is associated with the 1,3-butadiene product prior to removal of product from the system.

7. The process according to claim 6 wherein the contacting of a portion of the second intermediate reflux stream with the sodium nitrite solution stream is accomplished by vigorous intermixing of the two streams, and subsequent thereto passing the resulting mixture to a separator zone wherein said mixture is phase separated.

References Cited

UNITED STATES PATENTS

| | | | |
|---|---|---|---|
| 2,388,834 | 11/1945 | Douslin et al. | 203—8 |
| 2,473,203 | 6/1949 | Howe | 203—9 |
| 2,526,963 | 10/1950 | Morris | 203—6 |
| 2,613,175 | 10/1952 | Johnstone | 203—9 |
| 3,340,160 | 9/1967 | Waldby | 203—9 |
| 3,360,443 | 12/1967 | Apotheker | 203—9 |

WILBUR L. BASCOMB, JR., *Primary Examiner.*

U.S. Cl. X.R.

203—9, 43, 75, 78; 260—290, 666.5, 681.5, 669